No. 825,508. PATENTED JULY 10, 1906.
G. L. BAYLEY.
VALVE FOR FILTERS.
APPLICATION FILED MAY 8, 1905.

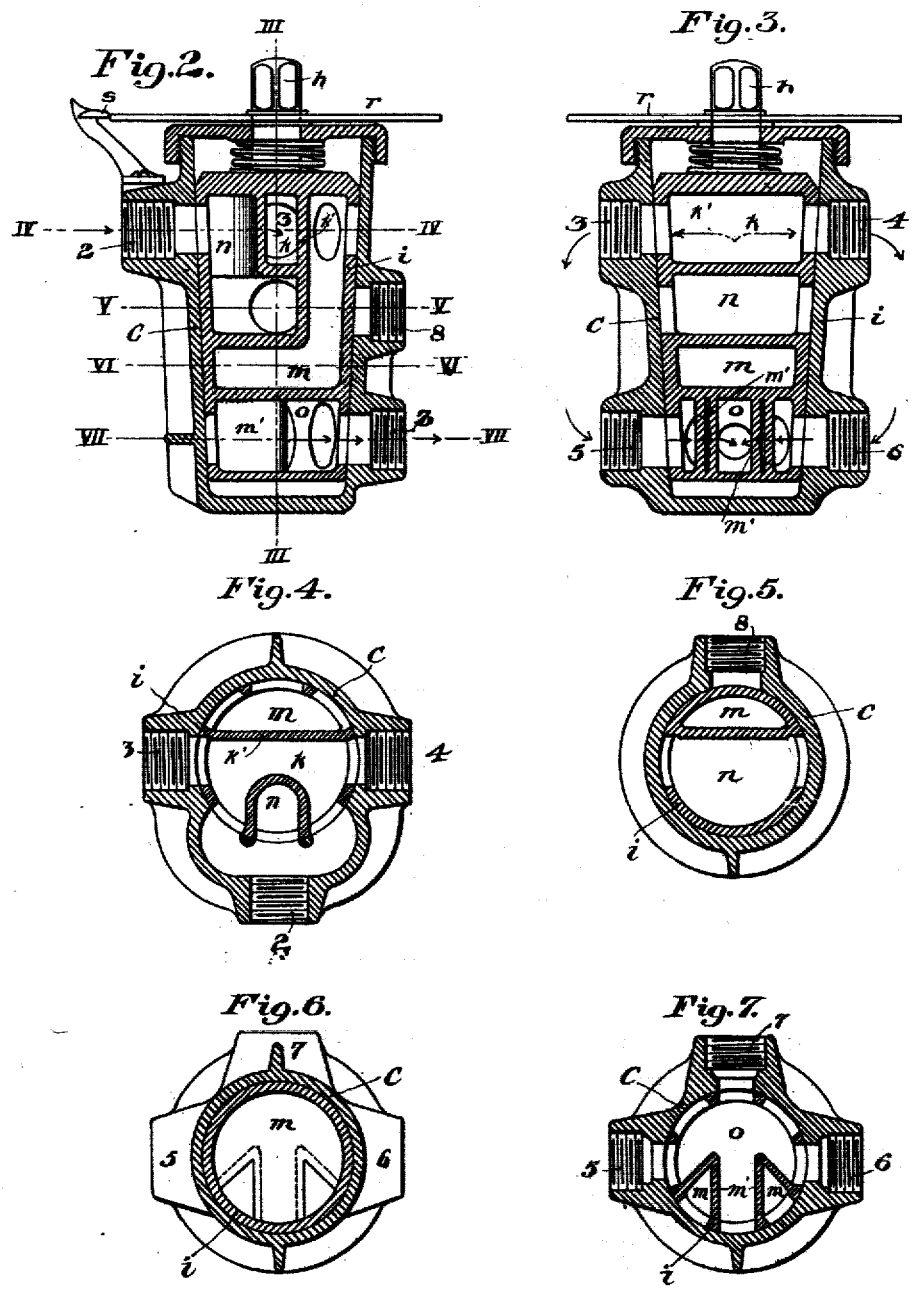

4 SHEETS—SHEET 3.

WITNESSES

INVENTOR

No. 825,508. PATENTED JULY 10, 1906.
G. L. BAYLEY.
VALVE FOR FILTERS.
APPLICATION FILED MAY 6, 1905.
4 SHEETS—SHEET 4.
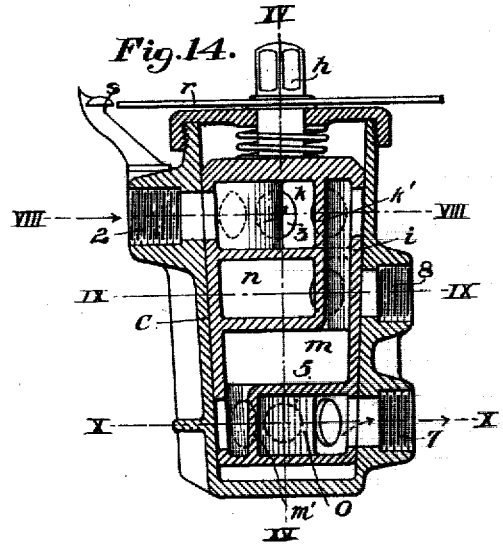
Fig. 14.
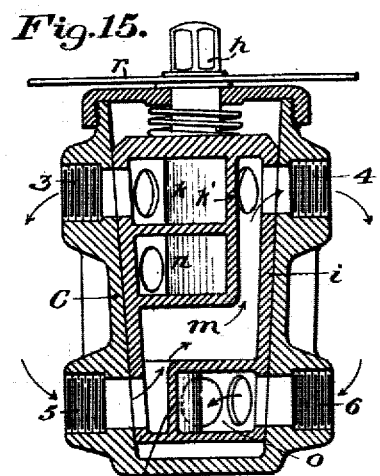
Fig. 15.
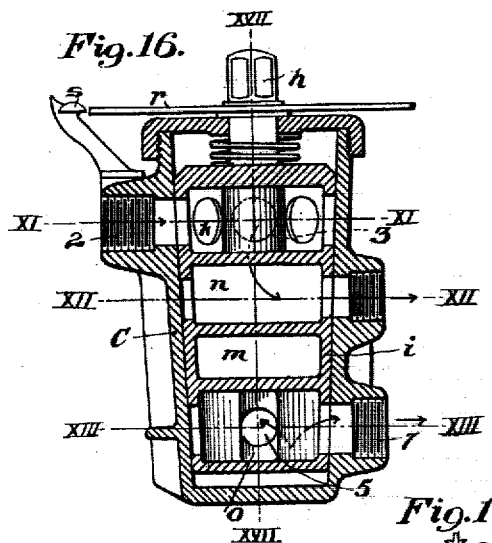
Fig. 16.
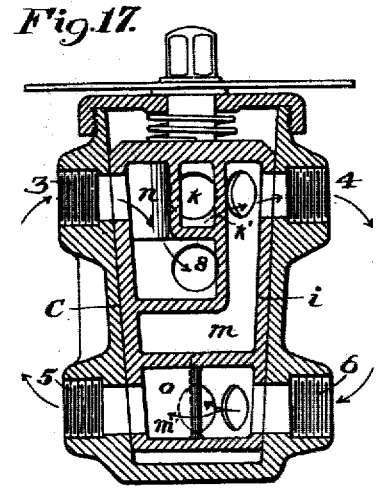
Fig. 17.
WITNESSES
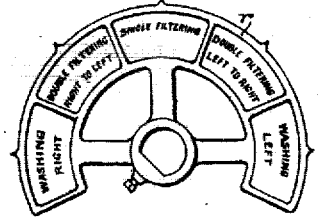
Fig. 18.
INVENTOR
Guy L. Bayley
by James K. Bakewell
his attorney

UNITED STATES PATENT OFFICE.

GUY L. BAYLEY, OF PITTSBURG, PENNSYLVANIA, ASSIGNOR TO JOHN H. FERTIG, OF TITUSVILLE, PENNSYLVANIA.

VALVE FOR FILTERS.

No. 825,508.     Specification of Letters Patent.     Patented July 10, 1906.

Application filed May 6, 1905. Serial No. 259,148.

*To all whom it may concern:*

Be it known that I, GUY L. BAYLEY, of Pittsburg, in the county of Allegheny and State of Pennsylvania, have invented a certain new and useful Valve for Filters, of which the following is a full, clear, and exact description, reference being had to the accompanying drawings, forming part of this specification, in which—

Figure 1:
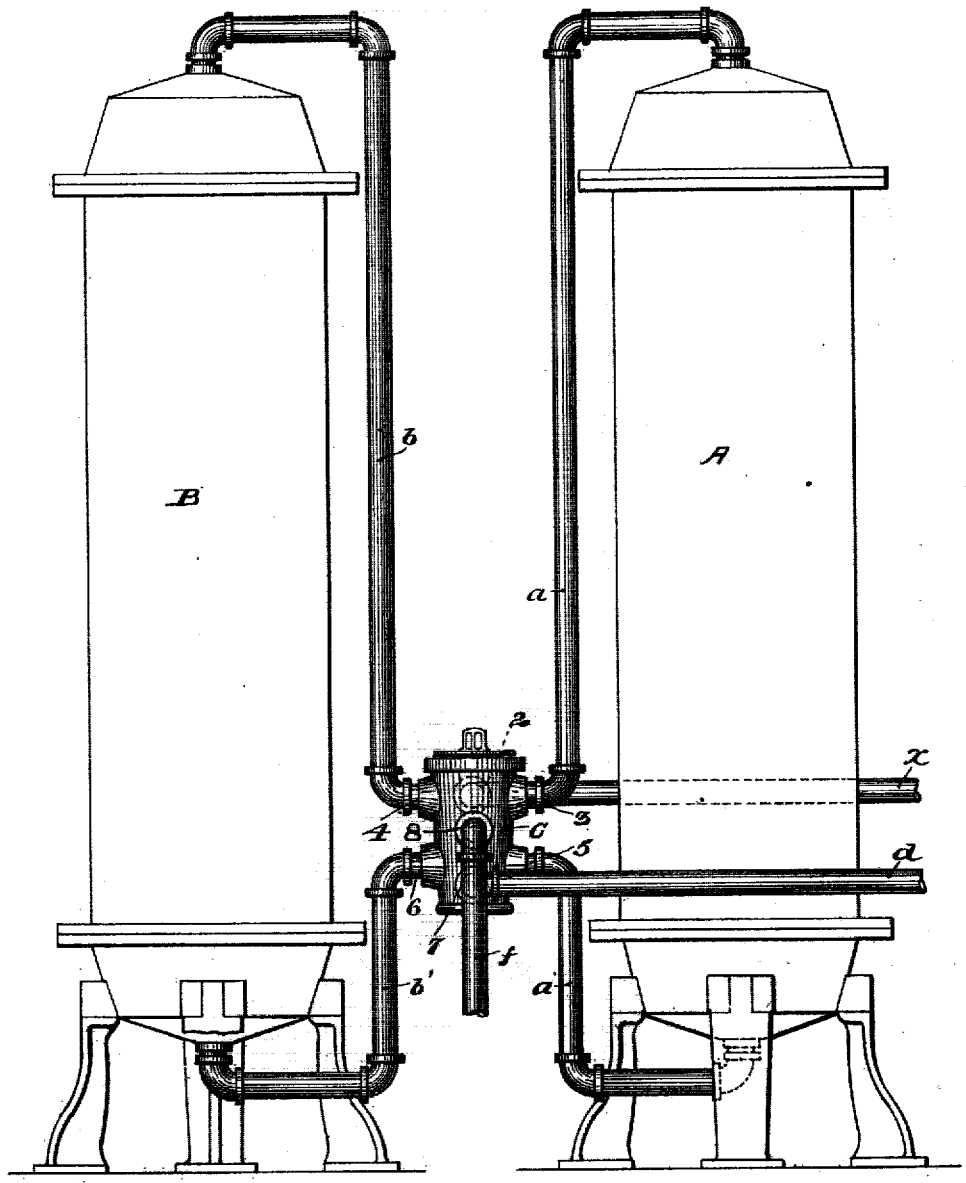
Figure 8:
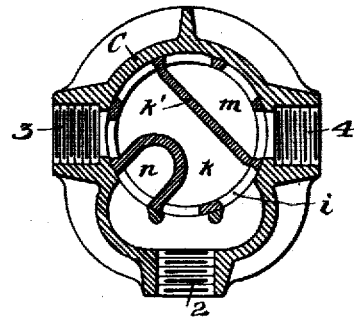
Figure 9:
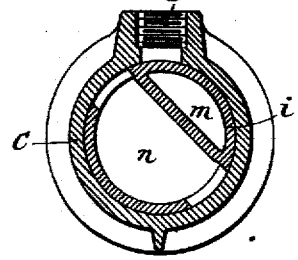
Figure 10:
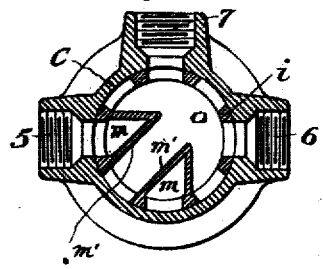
Figure 11:
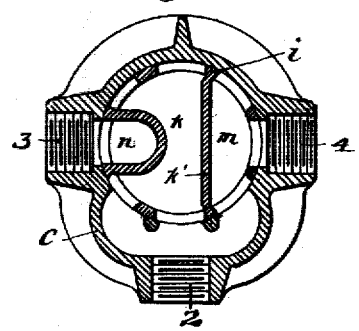
Figure 12:
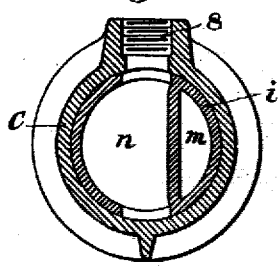
Figure 13:
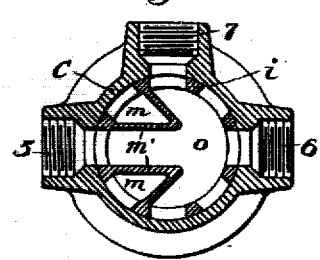

Figure 1 is an elevation illustrating my improvement. Fig. 2 is a vertical sectional view of the valve, the parts being shown in position for single-filtering. Fig. 3 is a vertical sectional view of the same on the line III III of Fig. 2. Figs. 4, 5, 6, and 7 are horizontal sectional views of the same on the lines IV IV, V V, VI VI, and VII VII, respectively, of Fig. 2. Figs. 8, 9, and 10 are horizontal sectional views of the same on the lines VIII VIII, IX IX, X X, respectively, of Fig. 14, the parts being in position in each figure for double-filtering. Figs. 11, 12, and 13 are horizontal sectional views on the lines XI XI, XII XII, and XIII XIII, respectively, of Fig. 16, the parts being shown in each figure in position for washing one of the cylinders with filtered water from the other cylinder. Fig. 14 is a vertical sectional view of the same, the parts being shown in position for double-filtering. Fig. 15 is a vertical sectional view of the same on the line XV XV of Fig. 14, the parts being shown in position for double-filtering. Fig. 16 is a vertical sectional view of the same, the parts being shown in position for washing one of the cylinders with filtered water from the other cylinder. Fig. 17 is a vertical sectional view of the same on the line XVII XVII of Fig. 16, the parts being shown in position for washing one of the cylinders with filtered water from the other cylinder, and Fig. 18 is a plan view of the dial for indicating the various positions of the valve-plug.

Like symbols of reference indicate like parts wherever they occur.

My invention relates to a valve which may be used to control and direct the flow of a liquid through any one or through several of a number of filters in various directions.

Heretofore in the use of certain water-filters there has been disturbance of the filtering material whenever the direction of the flow of water through the filter has been changed in passing from single to double filtering, or vice versa, and this disturbance is not only injurious to the filter itself, but it also renders the filtering operation more or less imperfect. There has also been more or less impure or dirty water passing to the service-pipe after the washing operation has been concluded.

The object of my invention is to provide a valve for changing the direction of the flow of liquid and also to change this direction in water-filters from single-filtering to double-filtering, or vice versa, in such a manner that the filtering material shall not be disturbed and also to change from washing to double-filtering in such a manner as to prevent any dirty water passing to the service-pipe.

In Fig. 1 of the drawings I have shown my valve applied to a filter having two filtering-cylinders, the filter being of that class in which the water may be single-filtered—that is, caused to divide into two streams, one of which is filtered in one cylinder and the other stream is filtered in the other cylinder—the filtered water from each cylinder passing into a common service-pipe, or the water may be double-filtered—that is, the entire stream of water is caused to pass first through one filtering-cylinder and then through the other filtering-cylinder, and then into the service-pipe—and the filtering-cylinders may be washed, each one with filtered water from the other of the two cylinders.

I will now describe my invention so that others skilled in the art to which it appertains may manufacture and use the same.

In the drawings, A and B represent the two filtering-cylinders, and C represents my improved valve. Leading to the valve C is the raw-water-supply pipe $x$, and leading from the valve C to the cylinders A and B are the supply-pipes $a$ and $b$, and leading from the cylinders A and B back to the valve C are the discharge-pipes $a'$ and $b'$. Leading from the valve C is the service-pipe $d$ and also the waste-pipe $f$.

In the drawings, Figs. 2, 14, 16, and 18, I show a dial $r$ so secured to the stem $h$ of the valve that as the stem and plug of the valve rotate the dial rotates therewith. Fastened to the casing of the valve is a pointer or index-finger $s$. This dial is marked at its middle tablet with the word "Single-filtering," or with letters or figures indicating the same, which is the first or ordinary position of the valve. On one side of this middle tablet is a tablet marked "Double-filtering right to left," or with letters or figures indicating the same, which is one of the second positions of the valve. On the other side of the middle tablet is a tablet marked "Double-filtering left to right," or with letters or figures indicating the same, which is the other of the second positions of the valve. At the two ends of the dial are tablets marked "Washing right" and "Washing left," or letters or figures indicating the same, which are the third positions of the valve. These tablets when brought opposite the pointer $s$ show the position of the plug of the valve in the casing, such position being the proper one for the operation indicated by the tablet.

In Figs. 2 and 3, which are vertical sectional views of the valve, and in Figs. 4, 5, 6, and 7, which are horizontal sectional views, I have shown the plug $i$ of the valve in position to single-filter the water—that is, the plug is in such position as to divide the water entering the valve-casing C from the raw-water-supply pipe $x$ into two streams, one stream passing through the pipe $a$ to the cylinder A and the other passing through the pipe $b$ to the cylinder B. The valve-casing C is provided with a supply inlet-port 2, which connects with the supply-pipe $x$, a supply outlet-port 3, which connects with the pipe $a$, leading to the cylinder A, a supply outlet-port 4, which is similar to the port 3 and connects with the pipe $b$, leading to the cylinder B, a discharge inlet-port 5, which connects with the pipe $a'$, leading to the valve from the bottom of the cylinder A, and a discharge inlet-port 6, which is similar to the port 5 and connects with the pipe $b'$, leading to the valve from the bottom of the cylinder B, a discharge outlet-port 7, that connects with the service-pipe $d$, and a washing or waste port 8, that connects with the waste-pipe $f$. The plug $i$ of the valve is provided with channels which may be brought into communication with the several ports in the casing by turning the plug on its axis. In the positions of Figs. 2, 3, 4, 5, 6, and 7, which is the position for single-filtering, the supply inlet-port 2 is in communication with the supply-pipe $x$ and the supply outlet-ports 3 and 4 are in communication with the pipes $a$ and $b$, and an open channel $k$, formed in the plug $i$, extends between the port 2 and the ports 3 and 4, thus permitting the water to pass from the supply-pipe $x$ to both cylinders A and B. After passing through the filtering material in the cylinders A and B the water passes from the cylinders through the pipes $a'$ and $b'$ to the discharge inlet-ports 5 and 6 in the valve-casing C and thence through the open channel $o$ to the discharge outlet-port 7, which is in communication with the service-pipe $d$. In this plug $i$ are four separate channels, of which the channel $k$—the upper of the channels—serves to direct the flow of water from the supply-pipe $x$ to the supply outlet-pipes $a$ and $b$, or either of them, through the ports 3 and 4 in the operation of single-filtering. A lower channel $n$ communicates with either of the ports 3 and 4 and pipes $a$ and $b$ and also with the waste-port 8 and waste-pipe $f$. This channel is used solely for the purpose of washing the cylinders A and B. The third channel $m$ communicates with either of the supply outlet-ports 3 and 4 and with either of the discharge inlet-ports 5 and 6 and serves as a return-passage for filtered water from the bottom of either one of the cylinders A B to the top of the other cylinder in double-filtering. A fourth channel $o$ communicates with the discharge-ports 5, 6, and 7 and serves as a passage for the filtered water from the cylinders A and B, either or both of them, to the service-pipe $d$.

The operation of these parts in double-filtering is as follows: The plug $i$ of the valve being in the position of single-filtering, hereinbefore described, to double-filter from the cylinder A to the cylinder B—that is, from right to left—the plug $i$ and the dial $r$ are turned to the right until the tablet indicating "Double-filtering right to left" comes opposite the pointer $s$. This brings the plug of the valve to the position shown in Figs. 8, 9, 10, 14, and 15 of the drawings. In this position the supply inlet-port 2 communicates with the channel $k$ and the channel $k$ communicates with the supply outlet-port 3, opening into the pipe $a$ and cylinder A, but is shut off from the supply outlet-port 4 by the partition $k'$. The effect of this is that all the water from the supply-pipe $x$ passes to the pipe $a$ and cylinder A, in which cylinder the water is single-filtered. In this position the discharge inlet-port 5 is in communication with the channel $m$, but is cut off by the partition $m'$ from the channel $o$, with which it is in communication in single-filtering. This channel $m$ is also in communication with the supply outlet-port 4 and pipe $b$, which leads to the cylinder B. A direct passage is thus formed from the bottom of the cylinder A to the top of the cylinder B, and the single-filtered water from the cylinder A passes through the cylinder B, where it is double-filtered. The ports 6 and 7 are in communication with the channel $o$, and after the water has passed through the cylinder B it passes to the service-pipe $d$ through the discharge-pipe $b'$ and the channel $o$ of the valve C.

The operation of washing the cylinder A is as follows: The dial $r$ and plug $i$ being in the position thus described—that is, for double-filtering from right to left—the dial $r$ and plug $i$ are given a further turn to the left, which brings the tablet indicating "Washing right-hand cylinder" opposite the index $s$. This movement also brings the plug $i$ of the valve C into the position shown by Figs. 11, 12, 13, 16, and 17, in which position the channel $k$ is in communication with the supply inlet-port 2 and also with the supply outlet-port 4 and with the pipe $b$, leading to the cylinder B. This forms an open channel between the supply-pipe $x$ and the cylinder B, permitting the water to pass to the cylinder B for single-filtering, and the water passes from the cylinder B, in which it is filtered, out through the pipe $b'$ and through the port 6 into the channel $o$. This channel $o$ is in communication with both the ports 5 and 6 and also with the port 7. Consequently part of the single-filtered water entering through the port 6 passes to the service-pipe $d$ through the port 7, and part of the single-filtered water passes through the port 5 and pipe $a'$ to the base of the cylinder A, where it passes through the filtering material from bottom to top. From the top of the cylinder A the dirty water, carrying the impurities, passes through the pipe $a$ to the port 3. This port 3 is now in communication with the washing-channel $n$, which channel is also in communication with the waste-port 8, which opens into the waste-pipe $f$. When the cylinder has been sufficiently washed, the dial and plug of the valve may be turned back to the position of double-filtering right to left, in which position the water is directed first to the cylinder A, which has just been washed, and after passing through the cylinder A passes to the cylinder B. The result of this is that any dirty water or stirred-up sediment remaining in the cylinder A after the washing operation is deposited in the cylinder B instead of passing to the service-pipe $d$, as would be the case were the water to be passed first through the unwashed cylinder and then through the washed cylinder containing the stirred-up sediment.

The operation of double-filtering left to right and washing the left-hand cylinder with filtered water from the right-hand cylinder is similar to the operations hereinbefore described, the dial and valve, of course, being turned in the opposite direction.

The advantages of my invention result from the construction and arrangements of ports and channels that enables the flow of water to be changed from single-filtering to double-filtering, and vice versa, without stirring up the filtering material and that enables the flow of water to be changed from "washing" to "filtering" without liability of carrying sediment from the washed cylinder into the service-pipe and also from the construction and arrangement of the parts of the valve that enables the water to flow through the several ports and channels with little friction without liability of leakage.

I have given the several ports names in accordance with their functions in the first or single-filtering position of the valve, and these names have been retained throughout the specification and claim, although the functions may be different in the several positions of the valve.

Changes of form and construction may be made in the valve without departing from my invention. It also may be applied to other forms of filters and to other uses than the filter shown and described in this specification.

In my copending application, Serial No. 258,703, filed May 5, 1905, I have described and claimed a construction similar to the present one, with the exception that in said construction upon the return movement of the plug of the valve from the third or washing position to the second or double-filtering position the discharge-inlet of the washed filtering-chamber is connected to the discharge outlet-port leading to the service-pipe, whereas in the present case upon such movement of the plug the discharge inlet-port of the washed filtering-chamber is connected with the outlet-port leading to the other filtering-chamber.

I claim—

The combination of two filtering-chambers: a valve-chamber having a supply inlet-port connected to the raw-water-supply pipe, two supply outlet-ports connected to said filtering-chambers, two discharge inlet-ports also connected to the filtering-chambers, a discharge outlet-port leading to the service-pipe, and a washing or waste port: and a plug adapted to said valve-chamber and provided with channels and ports adapted in the first or single-filtering position of the plug to connect said supply inlet-port with said two supply outlet-ports and said two discharge inlet-ports with said discharge outlet-port; in the second or double-filtering positions of the plug to connect the supply inlet-port with the supply outlet-port leading to one filtering-chamber and the discharge inlet-port of said filtering-chamber to the supply outlet-port of the other filtering-chamber, and the discharge inlet-port of the last-named filtering-chamber with the discharge outlet-port leading to the service-pipe; and in the third or washing positions of the plug to connect the discharge inlet-port of one filtering-chamber with the discharge inlet-port of the other filtering-chamber and the supply outlet-port of said last-named filtering-chamber with the waste-channel and waste-port; and in the return movement of the plug from the third or washing positions to the second or double-filtering positions to connect the discharge inlet-port of the washed filtering-chamber with the supply outlet-port of the other filtering-chamber; substantially as described.

In testimony whereof I have hereunto set my hand.

GUY L. BAYLEY.

Witnesses:
GEO. B. BLEMING.
CARRIE E. EGGERS.